US012639074B2

(12) United States Patent
Hartley et al.

(10) Patent No.: US 12,639,074 B2
(45) Date of Patent: May 26, 2026

(54) PREDICTION CIRCUITRY USING A PREDICTION TABLE PROVIDING A SKIP-FETCH-INSTRUCTION ENTRY

(71) Applicant: Arm Limited, Cambridge (GB)

(72) Inventors: Simon Alastair Hartley, Hornchurch (GB); Juan José García-Castro Crespo, Cambridge (GB)

(73) Assignee: Arm Limited, Cambridge (GB)

(*) Notice: Subject to any disclaimer, the term of this patent is extended or adjusted under 35 U.S.C. 154(b) by 40 days.

(21) Appl. No.: 18/745,756

(22) Filed: Jun. 17, 2024

(65) Prior Publication Data

US 2025/0383874 A1     Dec. 18, 2025

(51) Int. Cl.
G06F 9/38 (2018.01)
G06F 9/30 (2018.01)

(52) U.S. Cl.
CPC ........ G06F 9/3808 (2013.01); G06F 9/30069 (2013.01); G06F 9/30181 (2013.01); G06F 9/3802 (2013.01); G06F 9/3836 (2013.01)

(58) Field of Classification Search
CPC .... G06F 9/3808; G06F 9/30181; G06F 9/381; G06F 9/30069; G06F 9/3814; G06F 9/3017; G06F 9/3836
See application file for complete search history.

(56) References Cited

U.S. PATENT DOCUMENTS

| | | | | | |
|---|---|---|---|---|---|
| 5,742,781 | A | * | 4/1998 | Bajwa | G06F 9/3808 712/E9.058 |
| 6,691,308 | B1 | * | 2/2004 | Kasper | G06F 9/328 712/225 |
| 6,734,538 | B1 | * | 5/2004 | Sturcken | H01L 25/0657 438/455 |
| 7,178,013 | B1 | * | 2/2007 | Batcher | G06F 9/381 712/228 |
| 2007/0113057 | A1 | * | 5/2007 | Knoth | G06F 1/3203 712/E9.058 |
| 2012/0124344 | A1 | * | 5/2012 | Jarvis | G06F 9/325 712/230 |
| 2015/0293577 | A1 | * | 10/2015 | Hall | G06F 9/325 713/320 |

(Continued)

*Primary Examiner* — Keith E Vicary
(74) *Attorney, Agent, or Firm* — NIXON & VANDERHYE P.C.

(57) ABSTRACT

An apparatus comprises fetch circuitry configured to fetch instructions for processing by processing circuitry, and prediction circuitry configured to identify instructions to be fetched by the fetch circuitry. The prediction circuitry is configured to perform a lookup in a prediction table based on an address of a first instruction, and in response to the lookup identifying that the prediction table includes a skip-fetch-instruction entry corresponding to the address of the first instruction, the skip-fetch-instruction entry specifying information identifying an operation represented by at least one execute-without-fetch instruction subsequent in program order to the first instruction, the prediction circuitry is configured to control the fetch circuitry to skip fetching of the at least one execute-without-fetch instruction, and control the processing circuitry to perform the operation represented by the at least one execute-without-fetch instruction despite fetching of the at least one execute-without-fetch instruction being skipped.

19 Claims, 11 Drawing Sheets

(56) References Cited

U.S. PATENT DOCUMENTS

| | | | |
|---|---|---|---|
| 2016/0092230 A1* | 3/2016 | Chen | G06F 9/30065 |
| | | | 712/241 |
| 2019/0163902 A1* | 5/2019 | Reid | G06F 21/53 |
| 2022/0283811 A1* | 9/2022 | Al Sheikh | G06F 9/30065 |

* cited by examiner

1000 — Receive series of instructions of program

1002 — Identify first instruction followed by instruction able to be executed without fetching 1004 — Allocate skip-fetch-instruction entry in prediction cache associated with first instruction

PREDICTION CIRCUITRY USING A PREDICTION TABLE PROVIDING A SKIP-FETCH-INSTRUCTION ENTRY

BACKGROUND

Technical Field

The present technique relates to the field of data processing.

Technical Background

A data processing apparatus may comprise fetch circuitry and decode circuitry for fetching and decoding instructions for processing by processing circuitry. The rate at which instructions are fetched and decoded may in some cases limit performance of the data processing apparatus by restricting the number of operations which can be processed each cycle. Increasing the bandwidth supported by the fetch and decode circuitry may improve performance but at a higher area and power cost.

SUMMARY

At least some examples of the present technique provide an apparatus, comprising:

fetch circuitry configured to fetch instructions for processing by processing circuitry, and prediction circuitry configured to identify instructions to be fetched by the fetch circuitry; wherein the prediction circuitry is configured to perform a lookup in a prediction table based on at least part of an address of a first instruction, and in response to the lookup identifying that the prediction table includes a skip-fetch-instruction entry corresponding to the address of the first instruction, the skip-fetch-instruction entry specifying information identifying an operation represented by at least one execute-without-fetch instruction subsequent in program order to the first instruction, the prediction circuitry is configured to:

control the fetch circuitry to skip fetching of the at least one execute-without-fetch instruction, and control the processing circuitry to perform the operation represented by the at least one execute-without-fetch instruction despite fetching of the at least one execute-without-fetch instruction being skipped.

At least some examples provide a method for controlling processing circuitry and fetch circuitry for fetching instructions to be processed by the processing circuitry, comprising:

performing a lookup in a prediction table based on at least part of an address of a first instruction, and in response to the lookup identifying that the prediction table includes a skip-fetch-instruction entry corresponding to the address of the first instruction, the skip-fetch-instruction entry specifying information identifying an operation represented by at least one execute-without-fetch instruction subsequent in program order to the first instruction:

controlling the fetch circuitry to skip fetching of the at least one execute-without-fetch instruction, and controlling the processing circuitry to perform the operation represented by the at least one executewithout-fetch instruction despite fetching of the at least one execute-without-fetch instruction being skipped.

At least some examples provide computer-readable code for fabrication of an apparatus comprising:

fetch circuitry configured to fetch instructions for processing by processing circuitry, and prediction circuitry configured to identify instructions to be fetched by the fetch circuitry; wherein the prediction circuitry is configured to perform a lookup in a prediction table based on at least part of an address of a first instruction, and in response to the lookup identifying that the prediction table includes a skip-fetch-instruction entry corresponding to the address of the first instruction, the skip-fetch-instruction entry specifying information identifying an operation represented by at least one execute-without-fetch instruction subsequent in program order to the first instruction, the prediction circuitry is configured to:

control the fetch circuitry to skip fetching of the at least one execute-without-fetch instruction, and control the processing circuitry to perform the operation represented by the at least one execute-without-fetch instruction despite fetching of the at least one execute-without-fetch instruction being skipped.

The computer-readable code may be provided on a computer-readable storage medium. The storage medium may be non-transitory.

Further aspects, features and advantages of the present technique will be apparent from the following description of examples, which is to be read in conjunction with the accompanying drawings.

DESCRIPTION OF EXAMPLES

Figure 1:
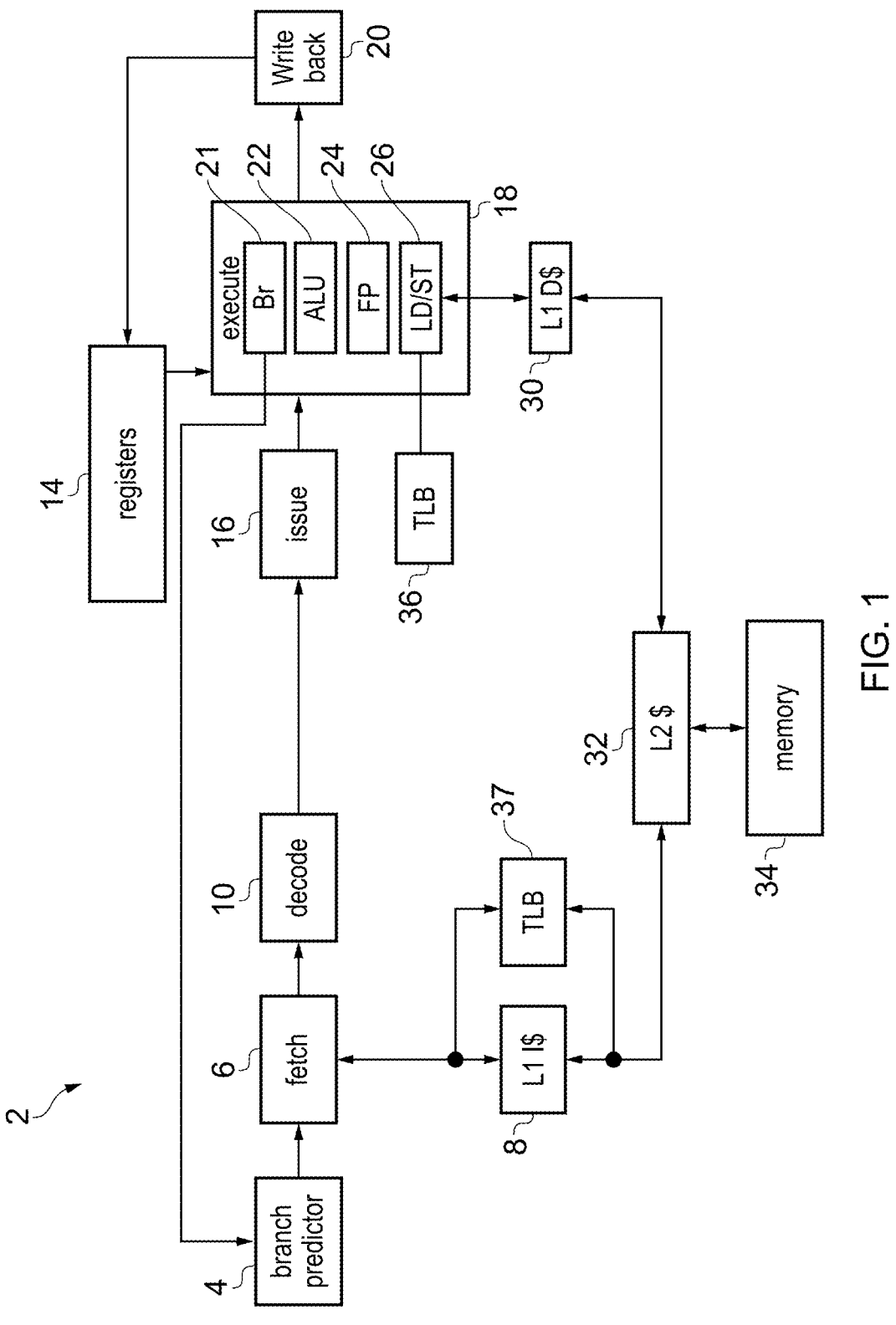
FIG. 1 schematically illustrates an example of a data processing apparatus comprising prediction circuitry.

A data processing apparatus comprises fetch circuitry configured to fetch instructions for processing by processing circuitry. The fetch circuitry may for example fetch instructions from a memory system from an address corresponding to a certain point in program flow. For sequential instructions, a next fetch address can be determined by applying an offset to the previous fetch address.

As discussed above, the bandwidth of the fetch circuitry may impose a restriction on performance of the processing circuitry by limiting a rate at which instructions can be provided to the processing circuitry. One approach to improve performance may be to increase the bandwidth of the fetch circuitry to enable more instructions to be fetched each processor cycle (similarly bandwidth for other components, such as decode circuitry, could be increased). However, the power and area costs of increasing the bandwidth of the fetch circuitry may be high and in some processors, especially processors designed for low-power applications, increasing the fetch bandwidth may be unfeasible.

The inventors of the present technique have realised that a rate at which operations are performed by the processing circuitry can be increased without requiring an increase in fetch bandwidth (although it will be appreciated that in some examples the present techniques could be used in combination with increasing a fetch bandwidth to further improve performance). In particular, the inventors have realised that a certain class of operations may be supported comprising operations which can be performed by processing circuitry without corresponding instructions actually being fetched by the fetch circuitry.

A prediction table may be used to trigger performance of operations of this class, to enable these operations to be performed at the correct point in program flow. In particular, if one or more instructions of a particular type or combination of types of the class which the hardware supports being architecturally executed without being fetched are observed in a program, then this can be recorded in the prediction table in an entry associated with a first instruction preceding those one or more instructions. Then, when that first instruction is encountered by fetch circuitry as it fetches instruction in the program (or when the prediction circuitry makes a prediction corresponding to the address of the first instruction) the prediction circuitry can control the processing circuitry to perform the operations of the subsequent instructions without having to fetch those subsequent instructions. In this way, performance can be improved because the instructions corresponding to those operations do not need to be fetched or decoded, and fetch bandwidth and pipeline occupancy can be freed up for use by other instructions.

Prediction circuitry is provided to perform a lookup in the prediction table based on at least part of an address of a first instruction. The first instruction may for example be the most recent fetched instruction (or the instruction whose address has been reached by the prediction circuitry at its current point of program flow—often the prediction circuitry may run ahead of the fetch circuitry and so may be making predictions regarding addresses of instructions which have not actually been fetched yet). The lookup of the prediction table enables the prediction circuitry to identify when the fetch circuitry can skip fetching of one or more subsequent instructions in the program. To support the present technique, the prediction table is configured to support storing a skip-fetch-instruction entry associated with a first instruction. The skip-fetch-instruction entry is configured to specify information identifying an operation represented by at least one execute-without-fetch instruction subsequent in program order to the first instruction. In response to a lookup in the prediction table, based on at least part of an address of a first instruction, identifying that the prediction table includes a skip-fetch-instruction entry corresponding to the address of the first instruction, the prediction circuitry is configured to control the fetch circuitry to skip fetching of the at least one execute-without-fetch instruction, and control the processing circuitry to perform the operation represented by the at least one execute-without-fetch instruction despite fetching of the at least one execute-without-fetch instruction being skipped.

It will be appreciated that an "execute-without-fetch" instruction is not necessarily a particular type of instruction, and instead is merely a label designating an instruction following the first instruction in program order which can be executed, without being fetched, based on information identified in a particular skip-fetch-instruction entry.

In some examples, the prediction table may only include skip-fetch-instruction entries. Hence, identifying that the prediction table contains an entry corresponding to the address of the first instruction may implicitly identify that said entry is a skip-fetch-instruction entry. In other examples, the prediction circuitry may include two or more types of entry. For example, the prediction circuitry may also contain branch prediction entries associated with a first address and configured to indicate a target address to be fetched after fetching the first address. Including multiple types of entry in the prediction table may be beneficial for performance because the same storage and lookup circuitry can be reused for branch prediction and for identifying cases where instructions may be executed without fetching, as both of these techniques may be performed using lookups based on the same fetch address. In such cases, to enable prediction table entries to be handled correctly, the prediction circuitry may be configured to determine whether a given entry of the prediction table is a skip-fetch-instruction entry based on an encoding of the given entry. For example, the given entry may comprise an indicator, such as a flag, identifying whether the entry is a skip-fetch-instruction entry or a different type of entry.

A skip-fetch-instruction entry specifies information identifying an operation represented by at least one execute-without-fetch instruction. In some cases, this identification may be implicit. For example, the prediction circuitry may support only one use case of an instruction pattern that can be executed without being fetched. In this case, identifying that there is a skip-fetch-instruction entry may be sufficient to identify what operation should be carried out by the processing circuitry.

However, in some examples, the prediction circuitry may support two or more types of operation which can be executed without being fetched. In such cases, to identify which operation should be performed after a particular first instruction in program order, the prediction circuitry may be configured to identify the operation represented by the at least one execute-without-fetch instruction based on an operation field of the skip-fetch-instruction entry.

The operation represented by the at least one execute-without-fetch instruction may be identified directly by the encoding of the skip-fetch-instruction entry. However, in some examples, the prediction circuitry may be configured to identify the operation represented by the at least one execute-without-fetch instruction based on an entry in skip-fetch-instruction operation storage circuitry, the entry selected based on the operation field the skip-fetch-instruction entry. Hence, the operation may be identified indirectly with reference to a storage structure. Entries of the storage structure may have more available encoding space than entries of the skip-fetch-instruction entries of the prediction table, and hence can allow more information about the operation to be identified.

The storage structure may be hardwired such that each entry corresponds to a particular operation. Alternatively, the storage structure may be programmable to enable selection of a particular subset of a given set of operations for which execution without fetching is supported, to enable the operations represented by the skip-fetch-instruction operation storage circuitry to be modified. For example, different operations may be more likely to occur in different regions of code and hence the operation storage circuitry may be programmed based on workload.

In some implementations of a prediction table, a lookup based on a first address may identify an entry allocated in response to a second address different from the first address. For example, the lookup may be performed using only a portion of the bits of the address which are identical for the first and second addresses. Alternatively, the addresses may be virtual addresses specified in different translation contexts, and whilst appearing the same would be translated to different physical addresses. The inventors have realised that such address aliasing, in which lookups based on different fetch addresses hit against the same entry, could in some cases lead to security vulnerabilities in a system supporting the use of a skip-fetch-instruction entry. For example, if a lookup based on a first address hits against a skip-fetch-instruction entry allocated in response to a second address, processing circuitry could be controlled to perform an operation corresponding to the instruction stored at the second address rather than the operation corresponding to the instruction stored at the first address for which fetching was skipped, and therefore an incorrect operation could be performed. It may be difficult to assess whether the correct operation was performed without actually fetching the instruction.

Hence, in some examples the prediction circuitry may be configured to support an aliasing-prevention operation to prevent the lookup in the prediction table based on the address of the first instruction from triggering suppression of fetching of a subsequent instruction based on information specified by a skip-fetch-instruction entry allocated in response to a second instruction different from the first instruction.

The aliasing-prevention operation may come in many different forms, and may depend on the microarchitecture of a particular implementation.

In some examples, the aliasing-prevention operation may comprise performing the lookup in the prediction table using sufficient bits of the first address (the address of the first instruction) to enable a given instruction within a given instruction context to be distinguished from other instructions within the same instruction context. Said sufficient bits may be referred to as a "full address". Instructions in a particular architecture may have a certain size, and the number of bits used in the lookup may be sufficient to uniquely identify each instruction-sized portion of memory. This can reduce the likelihood of two instructions stored at addresses which have, for example, identical least-significant portions but different most-significant portions, due for example to those instructions being stored in different address regions, from hitting against the same prediction table entry. Despite the terminology "full address", it will be appreciated that there may be no requirement for every address bit to be used in the lookup and hence included in the full address. If an address can identify portions of memory at a granularity finer than the size of an instruction then a number of the least significant bits, for example, may be excluded from the lookup performed using the aliasing-prevention operation.

In some examples, a prediction table entry may specify a match address identifying the instruction address associated with that entry. In some examples, the prediction table entry may specify, as the match address, the full instruction address to enable a full address lookup to be performed to reduce the likelihood of aliasing. In some alternative examples, a skip-fetch-instruction entry may specify a region entry of a region table, and the prediction circuitry may be configured to determine a most-significant portion of the match address based on the specified region entry. The remainder of the match address may be specified in the skip-fetch-instruction entry. Specifying a most-significant portion of the match address in a separate structure enables a full address to be used as a match address even in examples having restricted encoding space in the skip-fetch-instruction entry which may not enable a full address to be specified in the skip-fetch-instruction entry. This can support aliasing-prevention operations in which a full address is used to look up the prediction table. In addition, several entries of the prediction table may correspond to instructions in the same region of memory and hence may have identical most-significant portions of the match address. These entries may specify the same region entry and hence the total amount of storage required for the prediction table and the region table may be reduced compared to examples in which an entire match address is specified in each entry of the prediction table, because the same storage (within the region table) can be used for the most-significant portion of the match address for several entries of the prediction table.

In some examples, entries of the prediction table may indicate a target address. For example, where in addition to the skip-fetch-instruction entries the prediction table also supports branch prediction entries, the target address field may indicate the next address from which to fetch instructions following a branch instruction. In some examples, the target address may be specified by reference to a region table in a similar manner to the match address discussed above. Hence, in some examples, for an entry of the prediction table other than a skip-fetch-instruction entry the prediction circuitry may be configured to determine, based on the given field, a region entry of a region table for determining a target address associated with that entry. As discussed in greater detail below, skip-fetch-instruction entries may also indicate a target address to indicate the next fetch address following the first address. The inventors have realised that it will often be the case that the first address and the target address are in the same region of memory and hence correspond to the same region entry of the region table. Therefore, in some examples the same region identifier may be re-used for both the match address and the target address. The given field of the entry, used for specifying the region entry of the target address for entries other than a skip-fetch-instruction entry, may therefore be available to be re-used in the skip-fetch-instruction entry. In some examples, the prediction circuitry may be configured to identify the operation represented by the at least one execute-without-fetch instruction based on the given field. Hence, skip-fetch-instruction entries may be configured to both indicate a target address and identify an operation without requiring the skip-fetch-instruction entry to be larger than other entries in the prediction table.

In some examples, the aliasing-prevention operation may comprise, when triggered, preventing previously allocated entries of the prediction table from being treated by the prediction circuitry as skip-fetch-instruction entries. For example, if an indicator is provided identifying the entry as a skip-fetch-instruction entry, then that indicator may be cleared such that the entry is no longer identified as a skip-fetch-instruction entry. In this way, after the aliasing-prevention operation is triggered the entry can no longer be used to suppress fetching of an instruction whose operation is to be performed.

In some examples, the aliasing-prevention operation may comprise, when triggered, invalidating previously allocated entries of the prediction table. Hence, entries allocated before the trigger event would be unable to be used to suppress fetching of an instruction.

In the examples discussed above where the aliasing-prevention operation is triggered, the operation may generally be triggered in response to a risk that address aliasing may occur using a previously allocated prediction table entry.

In some examples, the prediction circuitry may be configured to trigger the aliasing-prevention operation in response to determining that a next instruction to be fetched is in a different region of memory from an immediately preceding instruction. A region of memory may for example be defined as a portion of memory comprising addresses having identical values of the N most significant bits. The entries previously allocated in the prediction table may have been associated with instructions in a first region of memory having the same most-significant address bits. If lookups are performed using only a portion of the address bits excluding the most-significant address bits then when moving into a new region of memory having different most-significant address bits, there may be a risk of encountering an instruction which matches one of the prediction table entries (due to having the same non-most-significant address bits) but is nevertheless associated with a different instruction. Hence, triggering the aliasing-prevention operation when program flow enters a new region of memory can reduce the likelihood of security vulnerabilities in examples which do not use a full address for looking up the prediction table.

In some examples, the prediction circuitry may be configured to trigger the aliasing-prevention operation in response to identifying a change in context of the processing circuitry. The prediction table may be looked up using virtual addresses. Different contexts may correspond to different schemes for translating virtual addresses to physical addresses, and hence different physical addresses may be associated with the same virtual address when those virtual addresses are specified in different contexts. Hence, if the entries in the prediction table are allocated whilst the processing circuitry is operating in a first context then, following a context change, a lookup in the prediction table using an address in a second context may hit against an entry even though that entry corresponds to a different location in memory and hence a different instruction. Triggering the aliasing-prevention operation in response to identifying a change in context of the processing circuitry can reduce the likelihood of lookups using an address in a first context hitting against entries associated with instructions in a second context, and hence, can reduce the likelihood of security vulnerabilities arising from the use of the skip-fetch-instruction entries.

After fetching the first instruction and identifying that one or more subsequent execute-without-fetch instructions do not need to be fetched, then fetch circuitry may resume fetching of instructions from a target address following the one or more execute-without-fetch instructions in program order. In some examples the target address from which to continue fetching may be determined implicitly. For example, the prediction circuitry may be limited to skip fetching of a predetermined number of instructions (e.g. a single instruction), and hence the target address may be determined by incrementing the program counter by a fixed amount (e.g. corresponding to the size of one instruction).

In other examples, the target address from which to continue fetching may not be implicit. For example, there may be a variable number of execute-without-fetch instructions. Furthermore, the execute-without-fetch instructions may include branch instructions meaning that the target address is not merely an incremented version of the program counter but a different address entirely. Hence, in some examples, in response to the lookup identifying the skip-fetch-instruction entry corresponding to the address of the first instruction, the prediction circuitry may be configured to determine a target address based on the skip-fetch-instruction entry and the fetch circuitry may be configured to resume fetching of instructions subsequent to the first instruction, following skipping of fetching of the at least one execute-without-fetch instruction, starting from the target address. By indicating the target address in the skip-fetch-instruction entry, this supports greater flexibility in the number and type of execute-without-fetch instructions, and in particular enables those instructions to include instruction-flow-changing instructions.

As described above, the target address may in some examples be identified using a combination of a target address field in the skip-fetch-instruction entry and the same region entry as the match address. Using the same region entry as the match address enables the given field (which may otherwise be used to specify a region entry for the target address) to be re-used to specify the operation of the execute-without-fetch instructions. This exploits the fact that jumps in the fetch address to skip fetching one or more execute-without-fetch instructions are very likely to be to an address in the same region as the match address, and so the increased circuit area that would have to be expended to allow for cases when the target address is in a different region to the match address is not justified. This may mean that fetching of an execute-without-fetch instruction cannot be skipped if the address of the execute-without-fetch instruction is near the boundary between regions so that the match address and target address would be in different regions, but in practice this may occur very rarely and so overall it can be more beneficial to save circuit area by reusing the region entry specifier for specifying the region entry corresponding to the match address to also indicate the region entry corresponding to the target address.

In some examples, the prediction circuitry may be configured to control the first instruction to progress to the processing circuitry with the first instruction associated with identifying information identifying that fetching of the at least one execute-without-fetch instruction was skipped. Providing identifying information can enable circuitry in the pipeline to handle execution of the execute-without-fetch instructions correctly despite those instructions not being in the pipeline. In some examples, the identifying information may be included within the decoded first instruction as it passes down the pipeline. Alternatively, the decoded first instruction may indicate that the first instruction is associated with some identifying information, and that identifying information may be specified in a control storage location. The control storage location could for example be a first-in-first-out (FIFO) storage structure.

In some examples, the identifying information may identify details about the operations indicated by the at least one execute-without-fetch instructions. For example, the identifying information may identify one or more of: an operation type, source and/or destination registers, other instruction control parameters, predicating conditions, and/or a predicted target address of each execute-without-fetch instruction.

In some examples, the prediction circuitry may be configured to control the first instruction to progress to the processing circuitry identifying control information associated with the at least one execute-without-fetch instruction, and the apparatus may comprise resolution circuitry configured to determine, based on the control information, whether the operation represented by the at least one execute-without-fetch instruction was performed architecturally correctly. It will be appreciated that this is not essential for all examples of execute-without-fetch instructions, as some types of supported execute-without-fetch instructions may be unconditional and not require resolution. Nevertheless, for conditional instructions, the resolution circuitry may evaluate whether the execute-without-fetch instructions were performed correctly in a similar way to resolution circuitry evaluating the status of instructions which are present in the pipeline. If an execute-without-fetch instruction is found to be incorrectly executed, for example, then a pipeline flush may be triggered to prevent processing errors.

In some examples, the operation represented by the at least one execute-without-fetch instruction may comprise a conditional operation, and the resolution circuitry may be configured to determine whether the processing circuitry was controlled to perform an operation corresponding to an outcome of the condition. For example, the execute-without-fetch instructions may include a conditional branch instruction and the resolution circuitry may determine, based on the control information, whether the branch direction and target address were predicted correctly. By passing control information to the resolution circuitry with the first instruction, correct architectural execution can be maintained for instructions which have been executed without being fetched.

Particular examples will now be described with reference to the Figures.

FIG. 1 schematically illustrates an example of a data processing apparatus 2 having a processing pipeline comprising a number of pipeline stages. The pipeline includes a branch predictor 4 for predicting outcomes of branch instructions and generating a series of fetch addresses of instructions to be fetched. A fetch stage 6 fetches the instructions identified by the fetch addresses from an instruction cache 8. A decode stage 10 decodes the fetched instructions to generate control information for controlling the subsequent stages of the pipeline. An issue stage 16 queues instructions awaiting execution until the required operands for processing those instructions are available in the registers 14. An execute stage 18 executes the instructions to carry out corresponding processing operations. A writeback stage 20 writes results of the executed instructions back to the registers 14.

The execute stage 18 may include a number of execution units such as a branch unit 21 for evaluating whether branch instructions have been correctly predicted, an ALU (arithmetic logic unit) 22 for performing arithmetic or logical operations, a floating-point unit 24 for performing operations using floating-point operands and a load/store unit 26 for performing load operations to load data from a memory system to the registers 14 or store operations to store data from the registers 14 to the memory system. In this example the memory system includes a level one instruction cache 8, a level one data cache 30, a level two cache 32 which is shared between data and instructions, and main memory 34, but it will be appreciated that this is just one example of a possible memory hierarchy and other implementations can have further levels of cache or a different arrangement. The load/store unit 26 may use a translation lookaside buffer 36 and the fetch unit 6 may use a translation lookaside buffer 37 to map virtual addresses generated by the pipeline to physical addresses identifying locations within the memory system. It will be appreciated that the pipeline shown in FIG. 1 is just one example and other examples may have different sets of pipeline stages or execution units.

Figure 2:
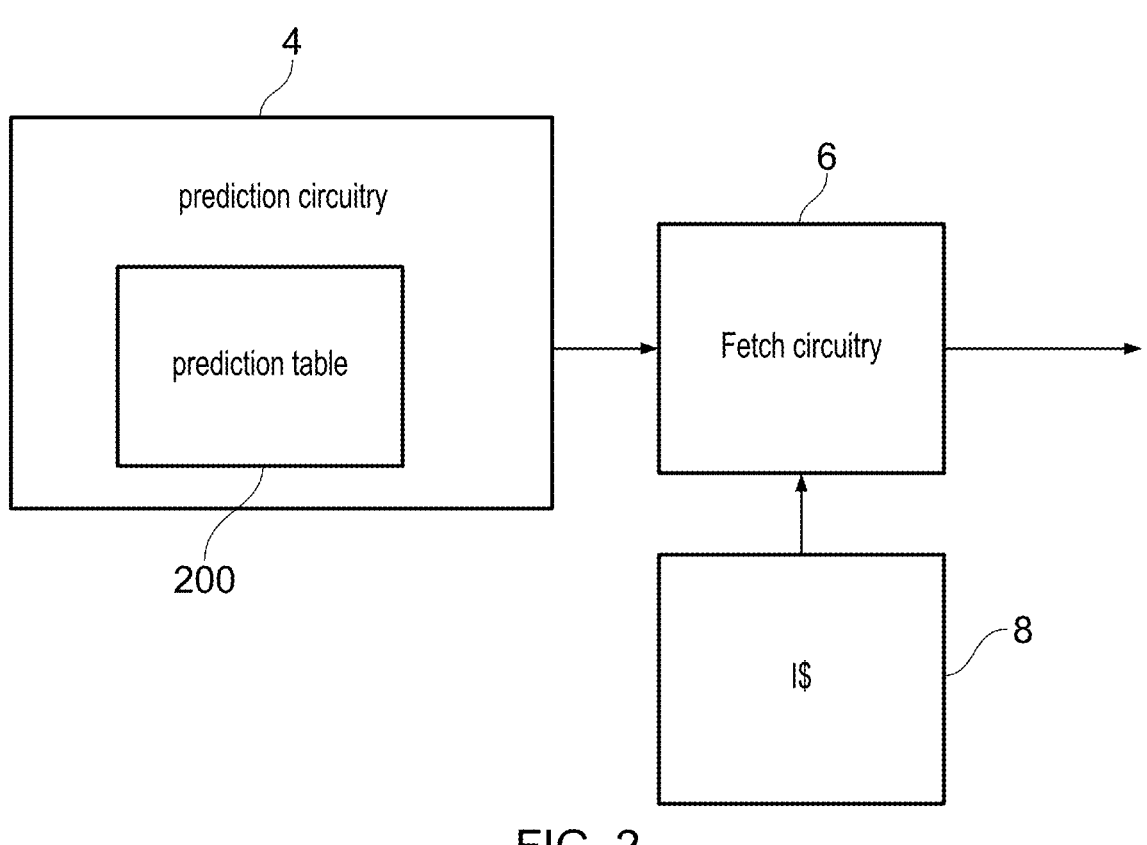
FIG. 2 schematically illustrates an example of prediction circuitry comprising a prediction table.

FIG. 2 illustrates the prediction circuitry 4 in more detail. Although shown in FIG. 1 as a branch predictor, it will be appreciated that in some examples the prediction circuitry 4 may not provide branch predictions and may only identify execute-without-fetch instructions. However, implementation of the prediction circuitry by reusing existing branch prediction circuitry can be significantly more efficient and hence in the example of FIG. 1 the prediction circuitry 4 also acts as branch prediction circuitry.

The inventors have realised that a prediction table 200 can be used to improve performance by enabling certain instructions to be executed without being fetched, thus freeing up fetch and pipeline bandwidth for other instructions. In particular, if one of a particular set of instruction types is observed in a program, then a skip-fetch-instruction entry can be allocated in the prediction table 200 in association with the preceding instruction in program flow. When fetching the program for execution, a lookup using the fetch address can be performed in the prediction table. When the lookup identifies a skip-fetch-instruction entry, this identifies that the fetch address is an address of an instruction followed by one or more execute-without-fetch instructions. Hence, the prediction circuitry 4 can control the fetch circuitry 6 to skip fetching of the one or more subsequent execute-without-fetch instructions, and control the processing circuitry 18 to perform operations corresponding to said execute-without-fetch instructions despite those instructions not being fetched.

The skip-fetch-instruction entry may identify the operations represented by the one or more execute-without-fetch instructions, and could also identify a target address from which fetching is to resume after the one or more following instructions for which fetching can be skipped.

In examples where the prediction circuitry 4 is provided as branch prediction circuitry, the prediction table may comprise a branch target address cache (BTAC), also known as a branch target buffer (BTB). The prediction table 200 may be used for predicting outcomes of branch instructions, by storing information identifying the existence of branches at particular memory addresses, along with a previously observed branch target address. The prediction circuitry 4 looks up the prediction table 200 using the fetch address, and in response to the lookup hitting against a branch prediction entry, the target address of the hit prediction table entry can be used as the program counter for the next fetch when it is predicted that the branch will be taken. It will be appreciated that branch prediction and identification of execute-without-fetch instructions may both include performing a table lookup using a fetch address, and hence it can be significantly more efficient to combine storage and logic for implementing both functions.

Figure 3:
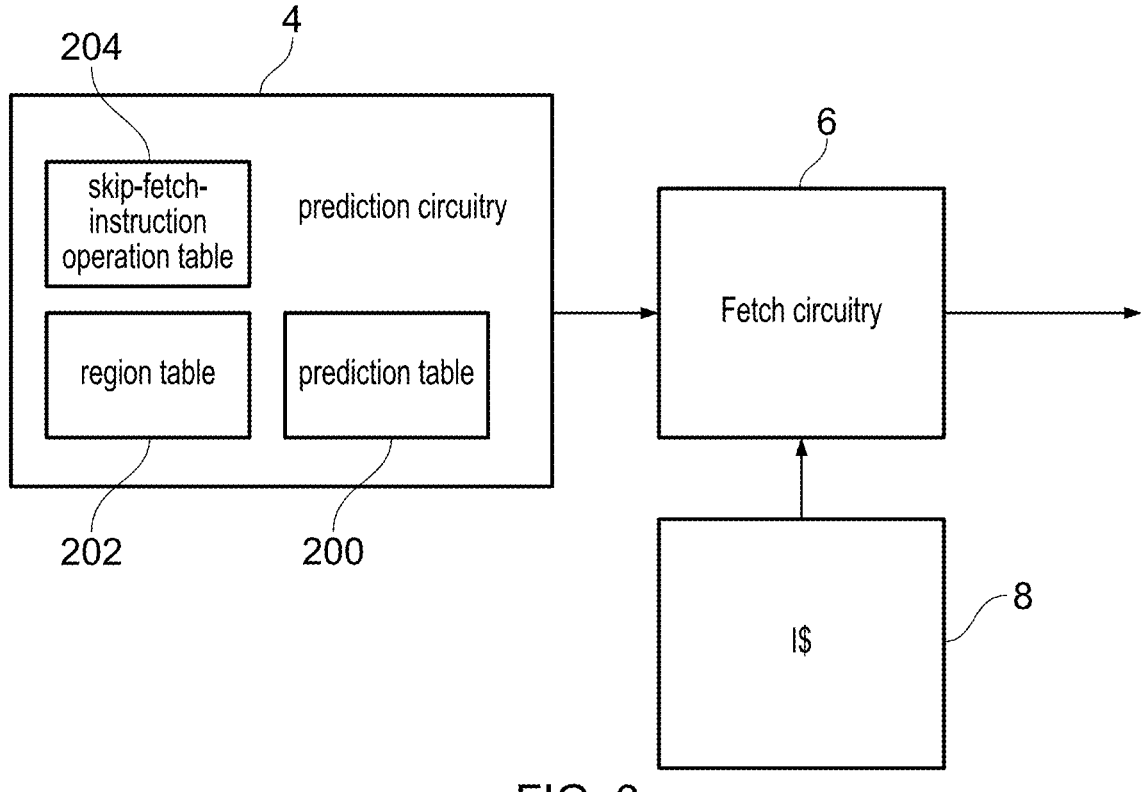
FIG. 3 schematically illustrates a specific example of the prediction circuitry of FIG. 2.

FIG. 3 illustrates prediction circuitry 4 according to examples of the present technique. In the example of FIG. 3, the prediction circuitry 4 further comprises a region table 202 and a skip-fetch-instruction operation table 204.

The skip-fetch-instruction operation table 204 stores details of operations, and may be referenced by a skip-fetch-instruction entry to identify the operation of the one or more execute-without-fetch instructions, and hence to indicate to the processing circuitry which operations should be performed. This enables a greater range of operations to be supported by the hardware, compared to examples where an operation is specified within the encoding of the skip-fetch-instruction entry alone or is identified implicitly.

The region table 202 stores portions of addresses corresponding to different regions of memory. The region table may be referenced by a prediction table entry to enable a full address comparison to be performed, whilst reducing storage cost of the prediction table by avoiding duplicating storage of address bits for entries in the same memory region.

Figure 4A:
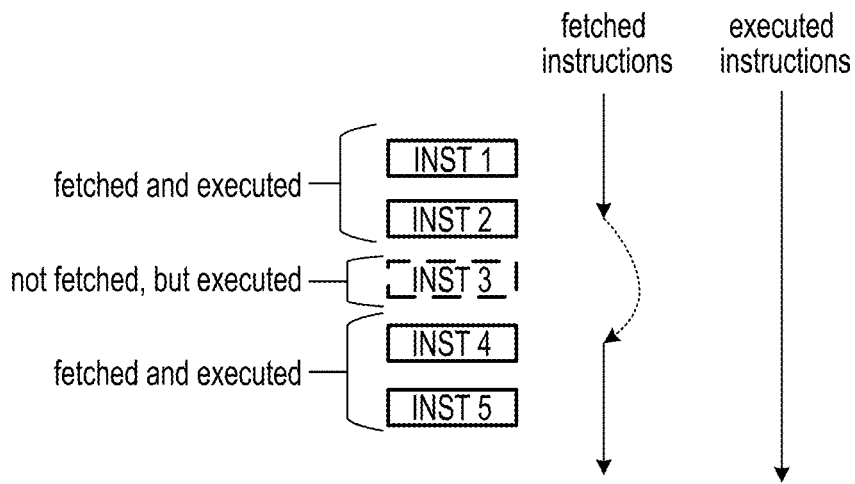
FIGS. 4A and 4B illustrate example sequences of instructions processed according to the present techniques.

FIG. 4A illustrates an example program flow in which an instruction is executed without being fetched. FIG. 4A illustrates a series of instructions in program order, and indicates which instructions are fetched and which instruction are executed.

Instruction 1 is fetched and executed as normal. On fetching instruction 1, the address of instruction 1 is used to look up the prediction table 200 and no entries are identified. Instruction 2 is fetched and executed as normal. On fetching instruction 2, the address of instruction 2 is used to look up the prediction table 200 and a skip-fetch-instruction entry is identified.

The skip-fetch-instruction entry identifies that instruction 2 is predicted to be followed by instruction 3 and identifies the operation of instruction 3 (e.g., identifies source registers, operation type, prediction, and so on). The skip-fetch-instruction entry may directly specify the operation of instruction 3 or may identify an entry in the skip-fetch-instruction operation table 204 specifying the operation. The skip-fetch-instruction may also indicate a target address from which fetching is to resume after instruction 2 (in this case, the target address may be the address of instruction 4). However, as instruction 3 is not an instruction-flow-changing instruction, the target address could alternatively be calculated based on an indication of a number of instructions for which fetching is skipped. In either case, the fetch circuitry 6 skips fetching of instruction 3 and continues fetching from instruction 4 onwards. However, despite fetching of instruction 3 being skipped, the prediction circuitry 4 controls the execute circuitry 18 to nevertheless perform the operation indicated by instruction 3 (so that instruction 3 is nevertheless architecturally executed, as its architectural effects are carried out—e.g. updates to register state and/or memory required for instruction 3 are still performed). Instruction 3 is therefore an execute-without-fetch instruction identified by a skip-fetch-instruction entry associated with instruction 2.

After instruction 3, execution continues from the next fetched instruction, instruction 4, and so on.

FIG. 4A therefore illustrates that architectural execution of a series of instructions can remain unchanged, whilst reducing the number of instructions which need to be fetched from memory, decoded by decode circuitry 10, consume issue slots in issue circuitry 16, etc. Hence, fetch bandwidth and pipeline throughput can be improved. Avoiding fetch can be particularly beneficial in examples where fetching of multiple instructions is possible in a single cycle. If an instruction fetched in the first instruction slot within a single cycle is a branch instruction predicted to be taken, then the bandwidth that could have been used for other instructions fetched in the same cycle may be wasted (if program flow skips over those instructions). However, if the branch instruction is an execute-without-fetch instruction, then the amount of wasted fetch bandwidth can be reduced because, as the branch instruction is not fetched, there are no wasted fetch slots associated with fetching the branch instruction. Nevertheless, this mechanism can also improve performance in cases where the execute-without-fetch instruction is not a branch instruction.

Figure 4B:
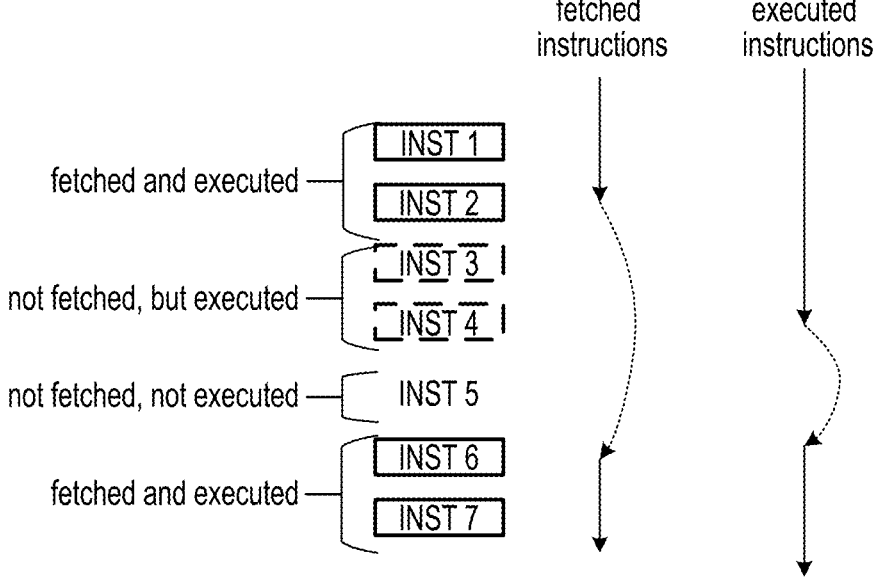

FIG. 4B illustrates a second example program flow comprising execute-without-fetch instructions. As in FIG. 4A, a skip-fetch-instruction entry is identified having a match address matching the address of instruction 2. FIG. 4B illustrates that operations of multiple instructions (instructions 3 and 4) may be triggered by the skip-fetch-instruction entry. FIG. 4B also illustrates that the execute-without-fetch instructions may comprise an instruction flow changing instruction. For example, instruction 3 could be a compare instruction for evaluating a condition, and instruction 4 could be a conditional branch instruction for conditionally triggering a branch depending on the outcome of the condition evaluated by the compare instruction.

In particular, instruction 4 of FIG. 4B is a branch instruction causing program flow to branch to instruction 6. This can be indicated in the skip-fetch-instruction entry by, along with including sufficient information identifying the branch instruction, setting the address of instruction 6 as the target address of the skip-fetch-instruction entry. Hence, fetching of instructions jumps from instruction 2 to instruction 6, and the architectural execution of instructions jumps from instruction 4 to instruction 6. Instructions 3 and 4 are therefore execute-without-fetch instructions. Instruction 5 is neither fetched nor architecturally executed, as it was branched over by instruction 4.

Figure 5:
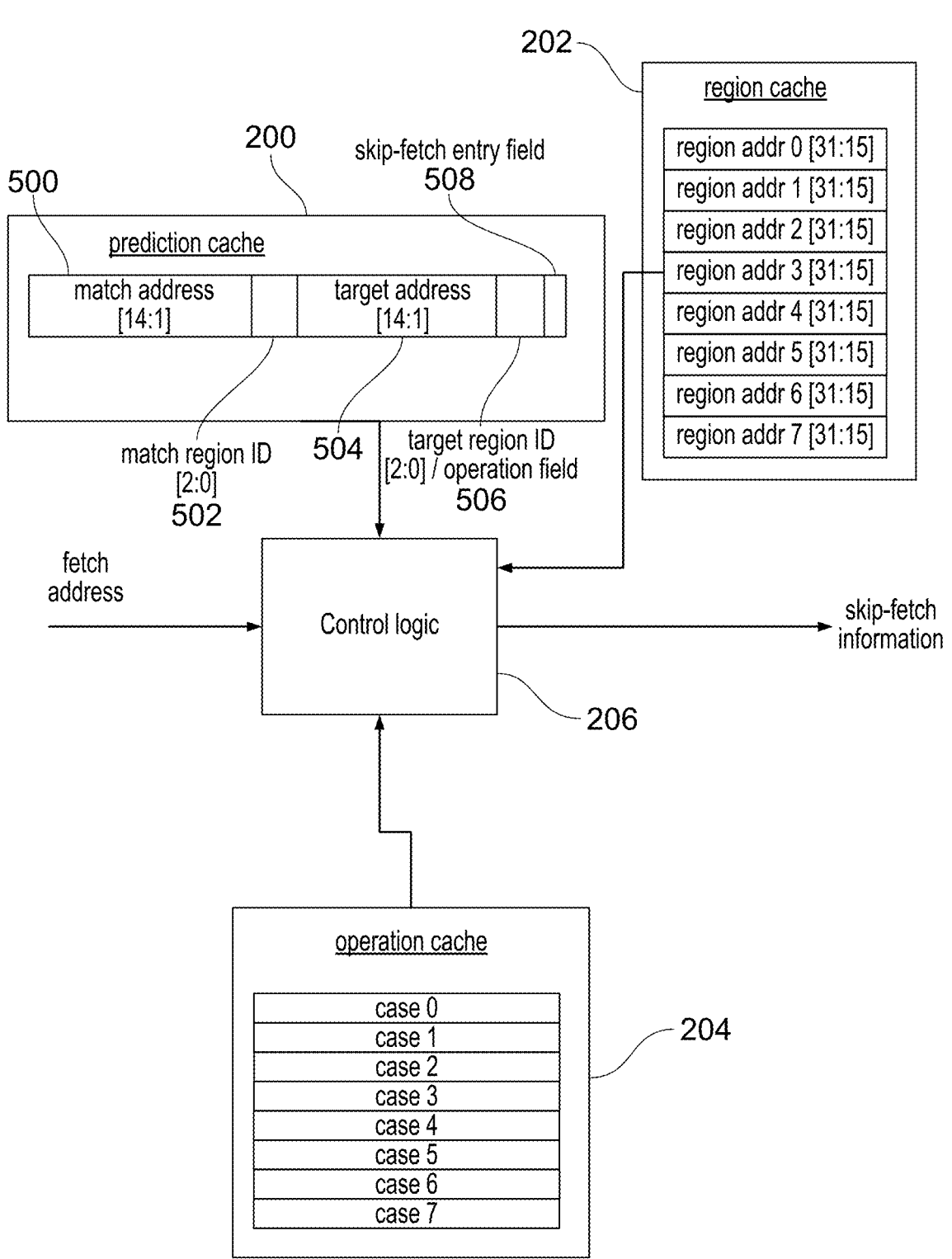
FIG. 5 illustrates an example of prediction circuitry for implementing the present techniques.
Figure 6:
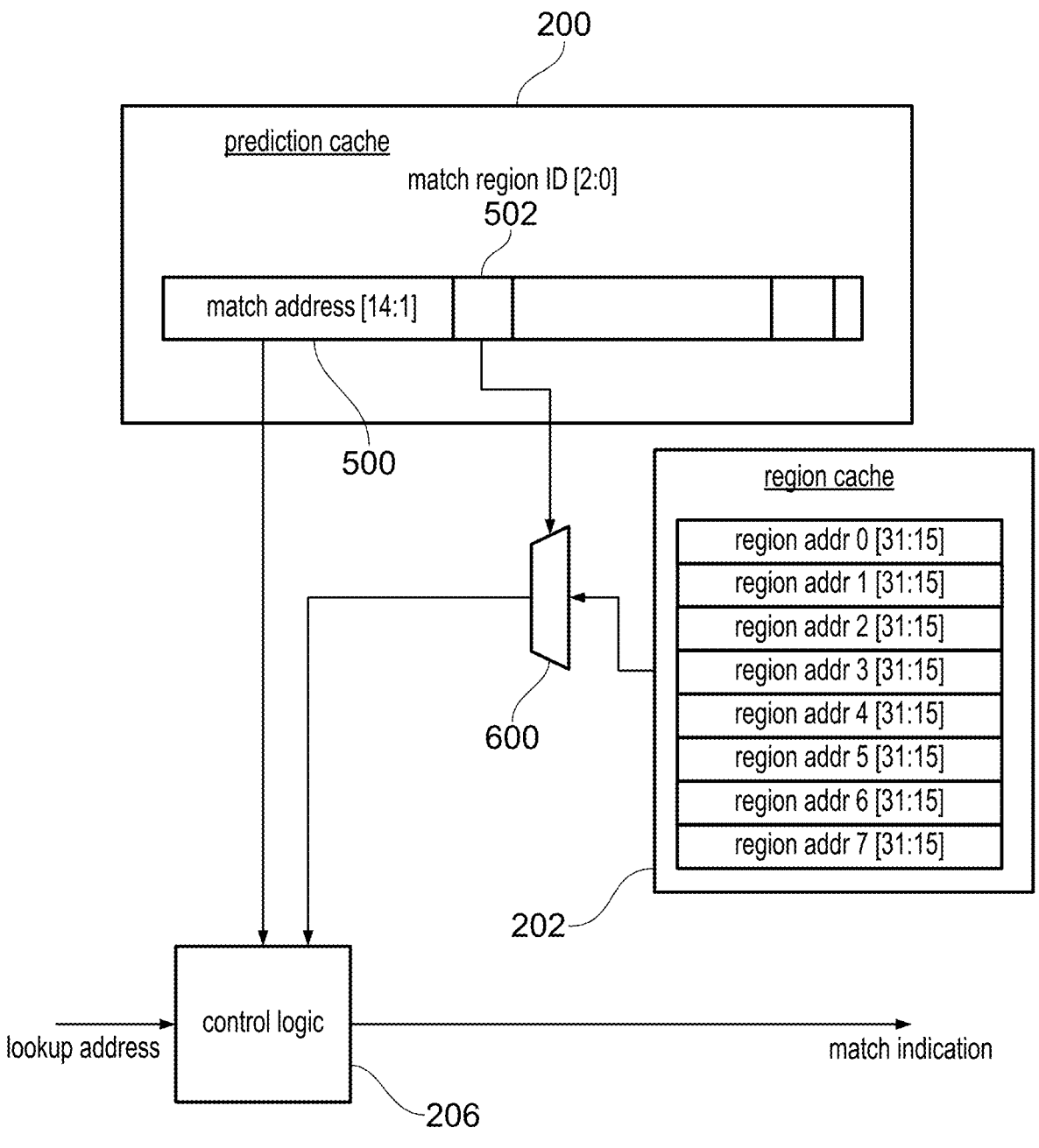
FIGS. 6 to 8 illustrate example control logic which may be provided in the example of FIG. 5.
Figure 7:
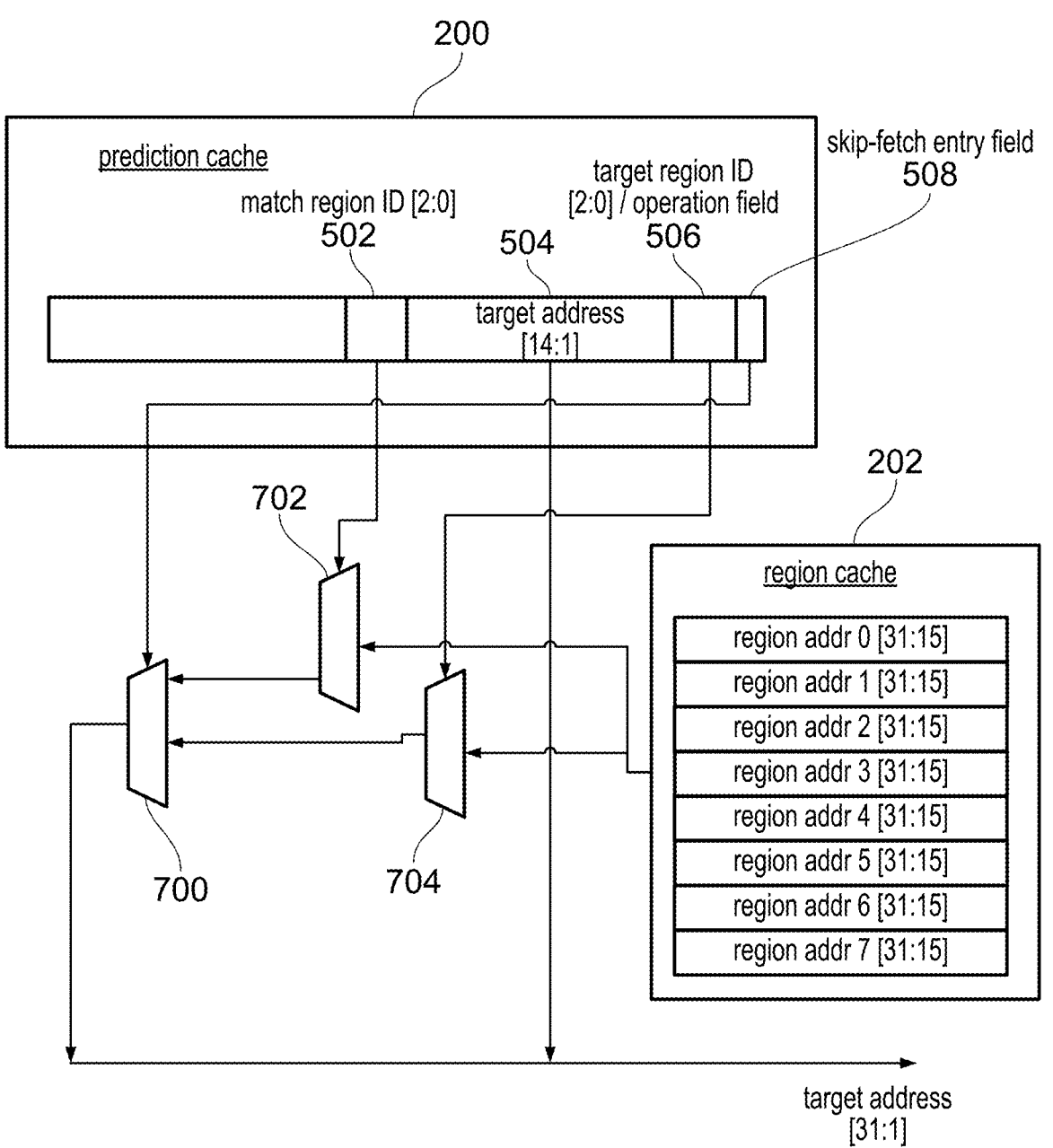
Figure 8:
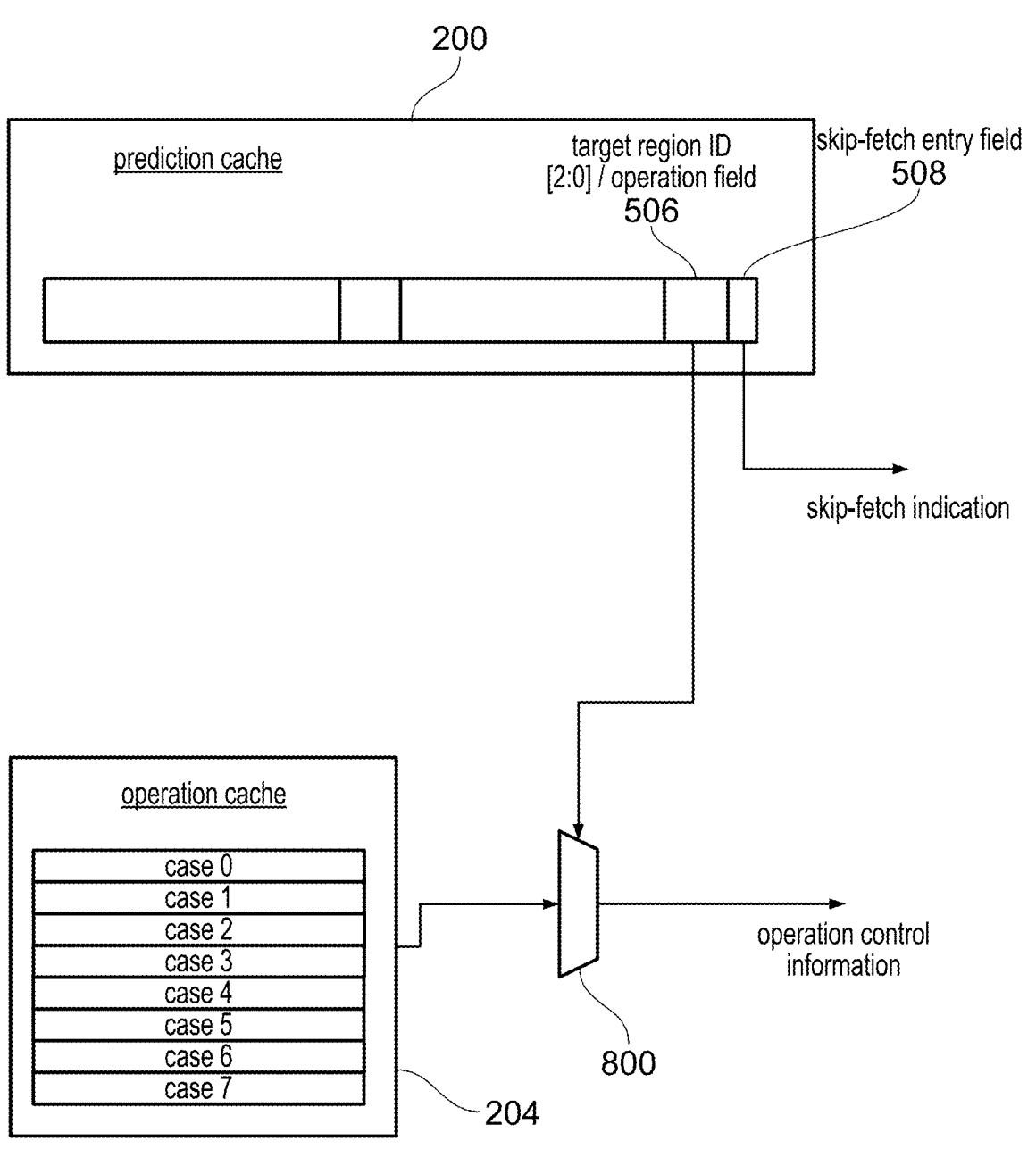

FIG. 5 schematically illustrates an example implementation of the prediction circuitry shown in FIG. 3. As illustrated in FIG. 5, the prediction table 200, region table 202, and skip-fetch-instruction operation table 204 may be connected via control logic 206. FIGS. 6 to 8 illustrate examples of logic provided by the control logic 206.

As illustrated in FIG. 5, an address is input into the prediction circuitry. The input address may for example be the address of the next instruction in a current program, such as the next address to be fetched. For example, the address input into the prediction circuitry may be a program counter address representing a point of program flow currently reached by the predictor. In the example of FIG. 5 the input address is a 32-bit address, although it will be appreciated that the same techniques could be applied in systems having addresses of different lengths.

In the example of FIG. 5, the prediction table comprises a plurality of entries, although only a single entry is illustrated for clarity. The prediction table 200 comprises entries which, based on their encoding, may be interpreted as either a branch prediction entry or a skip-fetch-instruction entry.

The entry shown in FIG. 5 comprises a match address field 500, a match region ID field 502, a target address field 504, a target region ID field 506, and a skip-fetch-instruction entry identifier field 508. It will be appreciated that this is merely one example encoding, and other encodings are within the scope of the present technique.

A lookup of the prediction table 200 comprises the input address being compared against the match address of entries in the prediction table to determine whether any of the entries correspond to the input address. The match address field 500 indicates bits 1 to 14 of the match address. The match region ID field 502 identifies an entry in the region table 202. The entry in the region table 202 identified by field 502 comprises the most-significant portion of the address, bits 15 to 31. Hence, the combination of the match address field 500 and the relevant entry of the region table 202 provides bits 1 to 31 of the match address, enabling a full address comparison between the lookup address and the each entry of the prediction table. Using a full address in a prediction table lookup, in particular using the most-significant bits, can avoid a lookup using a first address from unintentionally hitting against a prediction table entry allocated in response to a second address when the first and second address have identical least significant bits (for example, when the two addresses are in different regions of the virtual address space).

It will be appreciated that in this example bit 0 of the address is not used in the prediction table lookup. Although in other examples every address bit may be used for the lookup, if the full address is capable of identifying regions of memory at a finer granularity than an instruction block size then it may be unnecessary to use one or more of the least significant address bits in the lookup, as the lookup without one or more least significant bits may still be capable of uniquely identifying an instruction. Similarly, one or more most significant bits of the address may be excluded from the lookup if the value of said one or more most significant bits is expected to be identical for all addresses. For example, if it is known that the addresses in the prediction table correspond to a particular region of memory then certain most significant bits may be excluded from the lookup.

In the example of FIG. 5, the prediction table entry may be interpreted as either a branch prediction entry or a skip-fetch-instruction entry depending on the value of skip-fetch-instruction entry field 508. For example, field 508 may comprise a flag indicating whether the entry should be interpreted as a branch prediction entry or as a skip-fetch-instruction entry. In some examples, field 508 may be a multi-bit indicator, enabling indication of an entry type from three or more different options.

When interpreted as a branch prediction entry, the entry comprises a target address field 504 and a target region ID field 506. The target region ID field indicates one of the entries of the region table 202, and the combination of the target address field 504 and the identified region entry provides bits 1 to 31 of a target address. In response to a prediction table lookup hitting against a branch prediction entry, the program counter is set to the target address, and fetching jumps from the input address to the target address.

When interpreted as a skip-fetch-instruction entry, the entry shown in FIG. 5 comprises a target address field 504 and an operation field 506. The operation field 506 identifies an entry of the operation table 204, the identified entry providing information identifying an operation of an execute-without-fetch instruction, where the operation should be performed without a corresponding instruction being fetched. Information identifying the selected operation is passed down the pipeline with the instruction used to look up the prediction table, or may be set in a FIFO for reference by processing circuitry.

The target address field 504 provides bits 1 to 14 of the target address, from which fetching should continue after the lookup address. In the example of FIG. 5 there is no specific target region identifying field (the bits of this field instead being used to indicate the operation of the one or more execute-without-fetch instructions). Instead, the match region ID field 502 is used to identify the entry of the region table 202 for both the match address and the target address. Hence, the target address is provided by the combination of the target address field 504 and the entry of the region table 202 identified by the match region ID field 502.

FIG. 6 schematically illustrates example control logic for determining a match address based on a prediction table entry. As illustrated, the 3-bit match region ID field is used to control multiplexer 600 to select between the 8 region table 202 entries. Address bits from the selected entry are provided to control logic 206. Address bits 1 to 14 are also provided to the control logic 206 from match address field 500 of the prediction table entry. Control logic combines the address bits 1 to 14 and bits 15 to 31 to form the full match address, for comparison with the lookup address.

FIG. 7 schematically illustrates example control logic for determining a target address based on a prediction table entry. The prediction table entry shown in FIG. 7 may be used to indicate a target address of a branch prediction entry or a skip-fetch-instruction entry. When used for a skip-fetch-instruction entry the region entry is identified by the match region ID field 502, and when used for a branch prediction entry the region entry is identified by the target region ID field 506.

Multiplexer 702 selects a region table 202 entry under control of match region ID field 502. Multiplexer 704 selects a region table 202 entry under control of target region ID field 506. Skip-fetch-instruction entry field 508 controls multiplexer 700 to select between the outputs of multiplexers 702 and 704, such that bits 15 to 31 of the target address are selected using the match region ID field 502 when field 508 indicates that the entry is a skip-fetch-instruction entry, and target region ID field when field 508 indicates that the entry is a branch prediction entry. In either case, bits 1 to 14 of the target address are provided by the target address field 504.

FIG. 8 schematically illustrates example control logic for identifying an operation of one or more execute-without-fetch instructions using a skip-fetch-instruction entry. In the example of FIG. 8, the 3-bit operation field 506 is used to control the multiplexer 800 to select between 8 entries of the operation table 204. Each entry represents a set of operations to be performed by processing circuitry after executing the instruction used to lookup the prediction table. Information identifying the selected operation is passed to the processing circuitry, along with an indication from field 508 that the instruction used to look up the prediction table is followed by one or more execute-without-fetch instructions in program order.

Figure 9:
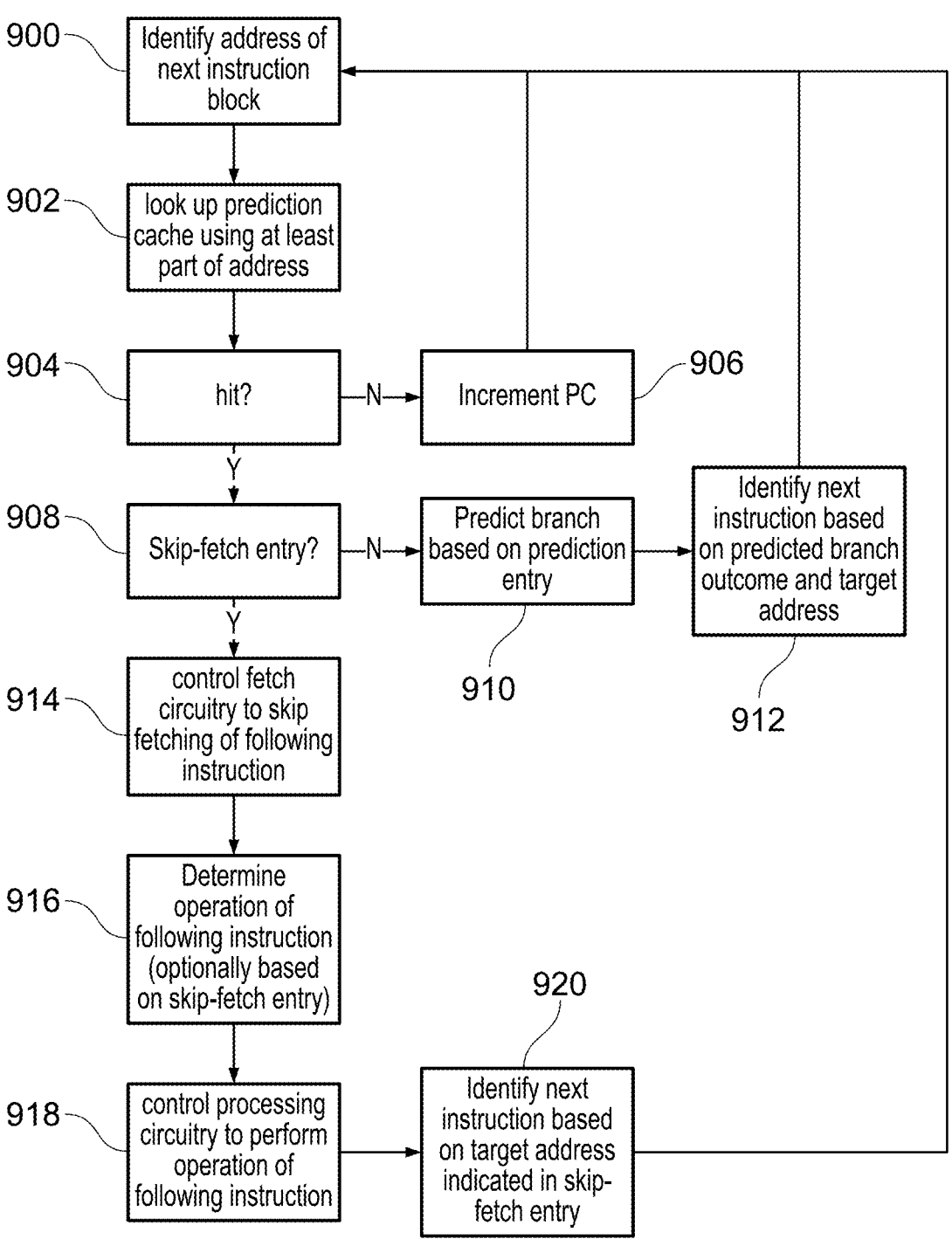
FIG. 9 is a flow diagram illustrating a method of using a prediction table according to the present invention.

FIG. 9 is a flow diagram illustrating a method of using a prediction table 200 in a data processing apparatus.

At step 900, an address of a next instruction block is identified (the first address). For example, the first address may be determined based on a program counter register. At least part of the first address is used to look up the prediction cache in step 902.

At step 904 it is determined whether the part of the first address used in the lookup matches a corresponding part of the match address of any one of the entries of the prediction table 200. If not, then the prediction table does not contain any relevant entries. For example, this may mean that the instruction stored at the first address has not previously been observed to be a branch instruction. It may also mean that the instruction stored at the first address has not been observed to be followed by one or more instructions which may be executed without fetching. Therefore, based on the prediction table, program flow is expected to continue linearly after the instruction at the first address. Hence, a next fetch address is determined by incrementing the program counter at step 906, and the process starts again at step 900 for the next instruction in the program.

If at step 904 an entry is identified, then at step 908 prediction circuitry 4 determines based on field 508 whether the hit entry is a branch prediction entry or a skip-fetch-instruction entry.

If the entry is a branch prediction entry then this indicates that the instruction at the first address has previously been observed to be a branch instruction. At step 910 the prediction circuitry determines whether the branch is indicated to be taken or not taken. This determination may be made based on a branch outcome field of the branch prediction entry in the prediction table, for example. At step 912 the next instruction address is calculated based on the predicted branch outcome. If the branch is predicted to be not taken, then the next instruction address is calculated based on incrementing the program counter as in step 906. However, if the branch is predicted to be taken then the target address is determined based on the branch prediction entry in the prediction table 200 as illustrated in FIG. 7.

If the entry is a skip-fetch-instruction entry then this indicates that the instruction at the first address has previously been observed to be followed in program order by one or more execute-without-fetch instructions which are able to be executed without being fetched. For example, there may be a set of execute-without-fetch instructions which correspond to entries of a skip-fetch-instruction operation table, and it may have been previously determined that the instructions following the first instruction belong to that set of instructions.

In response to determining that the entry is a skip-fetch-instruction entry, then at step 914 the prediction circuitry 4 controls the fetch circuitry 6 to skip fetching of the at least one execute-without-fetch instruction.

However, despite fetching of the at least one execute-without-fetch instructions being suppressed, at step 918 the prediction circuitry 4 controls processing circuitry (e.g., the execute stage of the pipeline) to perform an operation represented by the at least one execute-without-fetch instruction. The operation to be performed is identified at step 916. The operation may be determined by referencing an entry of an operation table, the entry identified by the hit skip-fetch-instruction entry. Alternatively, the operation may be specified directly by the entry, or the microarchitecture of the data processing entry may only support a single operation and therefore the operation may be identified implicitly based on the fact that a skip-fetch-instruction entry was identified.

In any case, at step 920 the prediction circuitry 4 identifies a target address from which to continue fetching instructions after the first instruction. The target address may be calculated by incrementing the program counter by a fixed amount, or based on a target address specified by a skip-fetch-instruction entry as illustrated in FIG. 7. In either case, once a next fetch address is identified the process returns to step 900 for processing of the next instruction.

Figure 10:
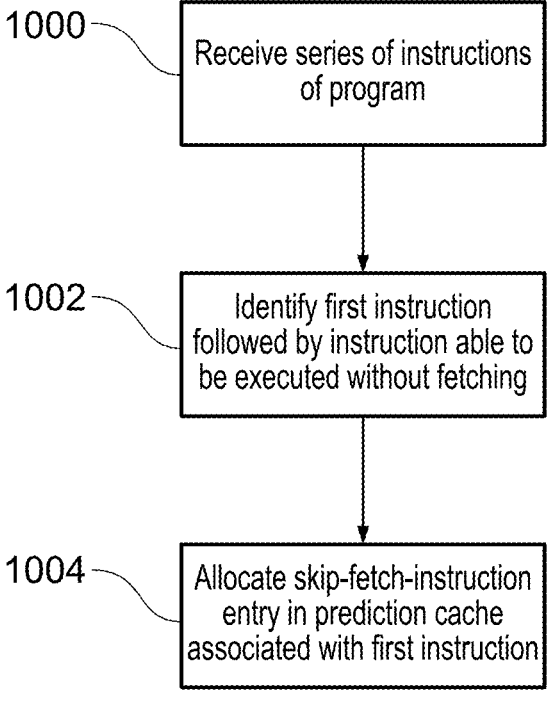
FIG. 10 is a flow diagram illustrating a method of allocating a skip-fetch-instruction entry in a prediction table.

FIG. 10 schematically illustrates a method for allocating a skip-fetch-instruction entry in the prediction table 200. It will be appreciated that various methods could be used to allocate an entry in the prediction table and that FIG. 10 merely illustrates an example.

At step 1000 a series of instructions of a program are received by prediction circuitry 4. For example the series of instructions could be received during runtime, or during a training period prior to execution of the program.

At step 1002 it is determined that the series of instructions comprises a first instruction followed by one or more instructions for which the data processing apparatus is configured to support execution without fetching. For example, the one or more instructions may represent operations already represented by an entry in the operation table or represent operations which may be supported by the operation table. In some examples it may be required that a target address from which to continue execution after the one or more execute-without-fetch instructions is located in the same memory region as the first instruction so that a match address region ID field 502 may be used for both a match address and a target address in an entry of the prediction table.

At step 1004 a skip-fetch-instruction entry is allocated in the prediction table 200 identifying the first instruction (using the match address), the operation represented by the one or more execute-without-fetch instructions and the target address from which to continue fetching after the first instruction. In some examples, multiple instances of the first instruction followed by suitable following instructions may need to be observed before confidence is high enough to allocate a skip-fetch-instruction entry in the prediction table.

Figure 11:
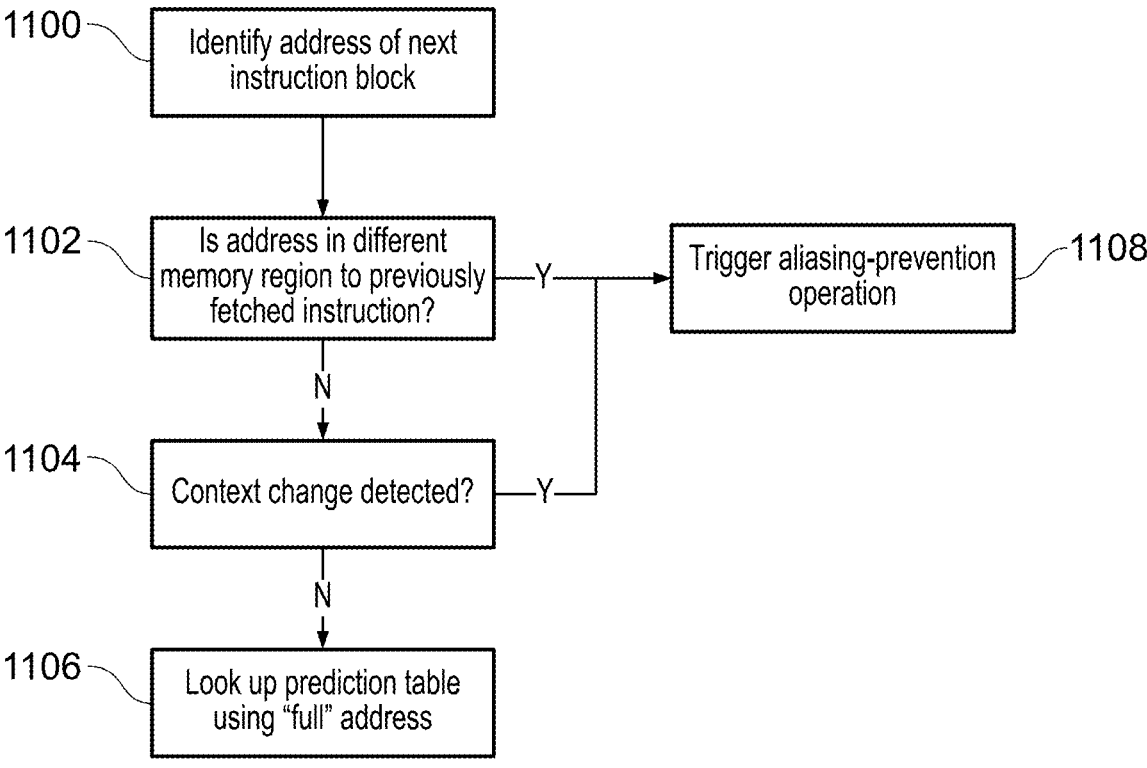
FIG. 11 is a flow diagram illustrating a number of aliasing-prevention operations.

FIG. 11 schematically illustrates a method for reducing the likelihood of security vulnerabilities arising from the execution of instructions without those instructions being fetched. Use of a skip-fetch-instruction entry may be associated with the risk that the operation performed for an execute-without-fetch instruction does not match the operation represented by the instruction stored in memory, and because the instruction stored in memory is not fetched it may be difficult to identify when this is the case. A particular risk arises if a first instruction happens to match against an entry allocated in response to a second instruction and therefore fetching of the first instruction is suppressed and the operation of the second instruction is performed instead of the first instruction.

One reason that a first address might match an entry allocated for a second address is that the first and second addresses have identical least-significant portions, e.g., bits 1 to 14 may be identical for both addresses, and the lookup mechanism uses only the least-significant part of the address to look up the prediction table. The most significant portion of the address designates a region of address space, and hence all addresses in a given portion of address space may have the same most significant bits, meaning that for as long as processing remains in one region of address space the risk may be low that a first and second address in that region have identical lower portions, and hence the risk of a first address hitting against an entry allocated in response to a second address may be low. If the prediction table comprises entries allocated whilst processing is in a first memory region, then there is a risk of an incorrect hit when processing enters a different memory region and a lookup is performed using an address in a different memory region.

Hence, in some examples, the method for using a skip-fetch-instruction entry comprises, following identifying a next instruction to look up the prediction table at step 1100, determining whether the address is in a different memory region (i.e., has different region-indicating address bits) to a previously fetched instruction. If so, this indicates that the program may be entering a new address region with the risk of a lookup using a first address hitting against an entry allocated in response to a second address and hence an aliasing-prevention operation may be triggered at step 1108.

A further reason that a first address might match an entry allocated in response to a second address is that the first and second addresses might be identical virtual addresses specified in different translation contexts, which would therefore be translated to different physical addresses and hence correspond to different instructions in memory. If the prediction table comprises entries allocated whilst processing is in a first context, then there is a risk of an incorrect hit when processing enters a different context and a lookup is performed using an address in a different context.

Hence, in some examples, at step 1104 it may be determined whether a context change has been detected (e.g., since the last lookup of the prediction table). If not then the lookup may go ahead. However, if a context change has been detected then an aliasing-prevention operation may be triggered at step 1108.

The aliasing-prevention at step 1108 is not particularly limited. Generally, the aliasing-prevention operation may aim to prevent a previously allocated skip-fetch-instruction entry being used to skip fetching of an instruction. In one example, the entries previously allocated into the prediction table may be invalidated. In a further example, the entries may at least be modified such that they cannot be interpreted as a skip-fetch-instruction entry.

At step 1106 the address identified in step 1100 is used to look up the prediction table. A further aliasing-prevention operation, which may be carried out in addition to or instead of the check at step 1102, is using a "full" address to look up the prediction table. A "full" address in this context may for example require that sufficient bits of an address are used to uniquely identify an instruction in a given instruction context. It will be appreciated that this may still enable one or more bits to be excluded from the lookup. However, if the most significant portion of the address is able to change, then it may be required that this portion of the address is used in the lookup to reduce the likelihood of a first address hitting against an entry allocated in response to a second address.

It will be appreciated that the aliasing-prevention operations illustrated in FIG. 11 are not limiting and further operations may be available to reduce the likelihood of aliasing in the prediction table.

Concepts described herein may be embodied in a system comprising at least one packaged chip. The apparatus described earlier is implemented in the at least one packaged chip (either being implemented in one specific chip of the system, or distributed over more than one packaged chip). The at least one packaged chip is assembled on a board with at least one system component. A chip-containing product may comprise the system assembled on a further board with at least one other product component. The system or the chip-containing product may be assembled into a housing or onto a structural support (such as a frame or blade).

Figure 12:
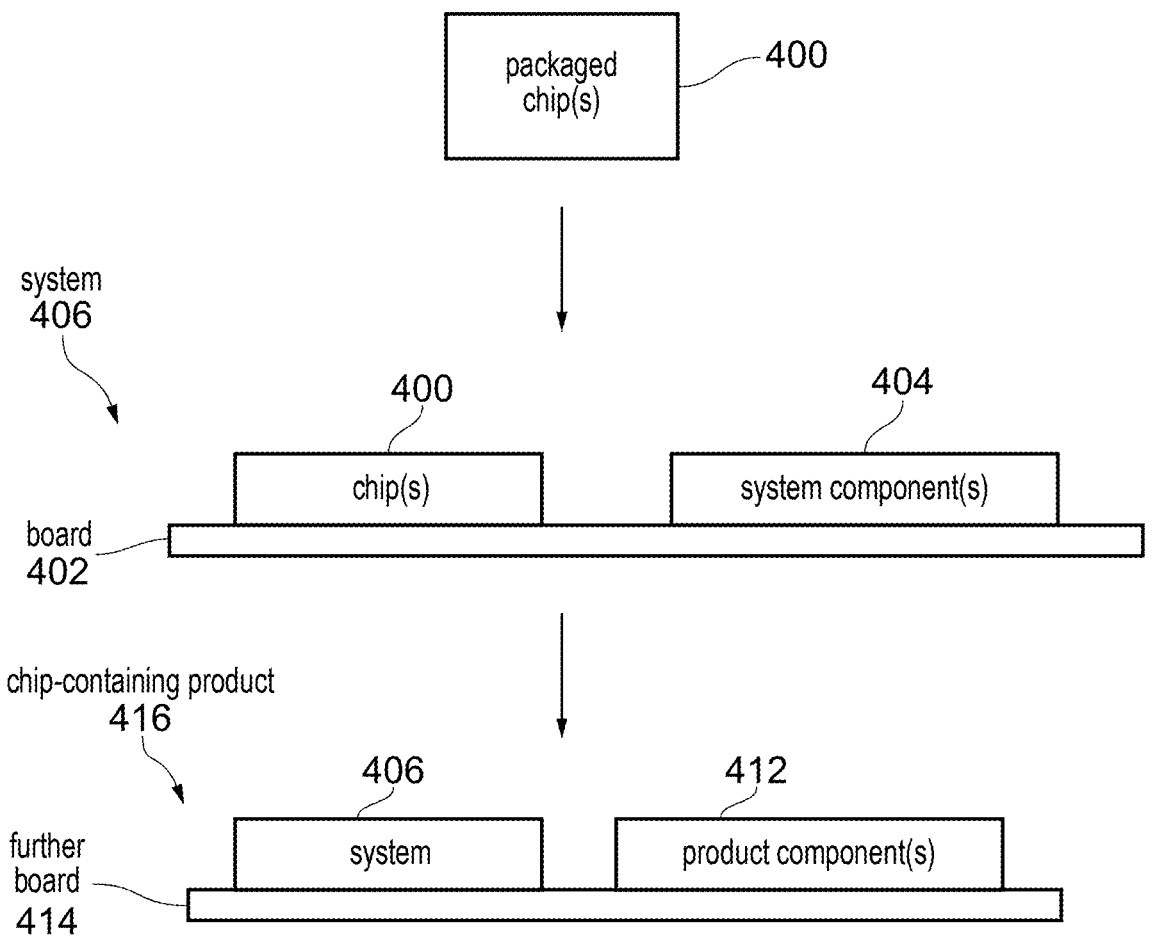
FIG. 12 illustrates a system and a chip-containing product.

As shown in FIG. 12, one or more packaged chips 400, with the apparatus described above implemented on one chip or distributed over two or more of the chips, are manufactured by a semiconductor chip manufacturer. In some examples, the chip product 400 made by the semiconductor chip manufacturer may be provided as a semiconductor package which comprises a protective casing (e.g. made of metal, plastic, glass or ceramic) containing the semiconductor devices implementing the apparatus described above and connectors, such as lands, balls or pins, for connecting the semiconductor devices to an external environment. Where more than one chip 400 is provided, these could be provided as separate integrated circuits (provided as separate packages), or could be packaged by the semiconductor provider into a multi-chip semiconductor package (e.g. using an interposer, or by using three-dimensional integration to provide a multi-layer chip product comprising two or more vertically stacked integrated circuit layers).

In some examples, a collection of chiplets (i.e. small modular chips with particular functionality) may itself be referred to as a chip. A chiplet may be packaged individually in a semiconductor package and/or together with other chiplets into a multi-chiplet semiconductor package (e.g. using an interposer, or by using three-dimensional integration to provide a multi-layer chiplet product comprising two or more vertically stacked integrated circuit layers).

The one or more packaged chips 400 are assembled on a board 402 together with at least one system component 404 to provide a system 406. For example, the board may comprise a printed circuit board. The board substrate may be made of any of a variety of materials, e.g. plastic, glass, ceramic, or a flexible substrate material such as paper, plastic or textile material. The at least one system component 404 comprise one or more external components which are not part of the one or more packaged chip(s) 400. For example, the at least one system component 404 could include, for example, any one or more of the following: another packaged chip (e.g. provided by a different manufacturer or produced on a different process node), an interface module, a resistor, a capacitor, an inductor, a transformer, a diode, a transistor and/or a sensor.

A chip-containing product 416 is manufactured comprising the system 406 (including the board 402, the one or more chips 400 and the at least one system component 404) and one or more product components 412. The product components 412 comprise one or more further components which are not part of the system 406. As a non-exhaustive list of examples, the one or more product components 412 could include a user input/output device such as a keypad, touch screen, microphone, loudspeaker, display screen, haptic device, etc.; a wireless communication transmitter/receiver; a sensor; an actuator for actuating mechanical motion; a thermal control device; a further packaged chip; an interface module; a resistor; a capacitor; an inductor; a transformer; a diode; and/or a transistor. The system 406 and one or more product components 412 may be assembled on to a further board 414.

The board 402 or the further board 414 may be provided on or within a device housing or other structural support (e.g. a frame or blade) to provide a product which can be handled by a user and/or is intended for operational use by a person or company.

The system 406 or the chip-containing product 416 may be at least one of: an end-user product, a machine, a medical device, a computing or telecommunications infrastructure product, or an automation control system. For example, as a non-exhaustive list of examples, the chip-containing product could be any of the following: a telecommunications device, a mobile phone, a tablet, a laptop, a computer, a server (e.g. a rack server or blade server), an infrastructure device, networking equipment, a vehicle or other automotive product, industrial machinery, consumer device, smart card, credit card, smart glasses, avionics device, robotics device, camera, television, smart television, DVD players, set top box, wearable device, domestic appliance, smart meter, medical device, heating/lighting control device, sensor, and/or a control system for controlling public infrastructure equipment such as smart motorway or traffic lights.

Concepts described herein may be embodied in computer-readable code for fabrication of an apparatus that embodies the described concepts. For example, the computer-readable code can be used at one or more stages of a semiconductor design and fabrication process, including an electronic design automation (EDA) stage, to fabricate an integrated circuit comprising the apparatus embodying the concepts. The above computer-readable code may additionally or alternatively enable the definition, modelling, simulation, verification and/or testing of an apparatus embodying the concepts described herein.

For example, the computer-readable code for fabrication of an apparatus embodying the concepts described herein can be embodied in code defining a hardware description language (HDL) representation of the concepts. For example, the code may define a register-transfer-level (RTL) abstraction of one or more logic circuits for defining an apparatus embodying the concepts. The code may define a HDL representation of the one or more logic circuits embodying the apparatus in Verilog, SystemVerilog, Chisel, or VHDL (Very High-Speed Integrated Circuit Hardware Description Language) as well as intermediate representations such as FIRRTL. Computer-readable code may provide definitions embodying the concept using system-level modelling languages such as SystemC and SystemVerilog or other behavioural representations of the concepts that can be interpreted by a computer to enable simulation, functional and/or formal verification, and testing of the concepts.

Additionally or alternatively, the computer-readable code may define a low-level description of integrated circuit components that embody concepts described herein, such as one or more netlists or integrated circuit layout definitions, including representations such as GDSII. The one or more netlists or other computer-readable representation of integrated circuit components may be generated by applying one or more logic synthesis processes to an RTL representation to generate definitions for use in fabrication of an apparatus embodying the invention. Alternatively or additionally, the one or more logic synthesis processes can generate from the computer-readable code a bitstream to be loaded into a field programmable gate array (FPGA) to configure the FPGA to embody the described concepts. The FPGA may be deployed for the purposes of verification and test of the concepts prior to fabrication in an integrated circuit or the FPGA may be deployed in a product directly.

The computer-readable code may comprise a mix of code representations for fabrication of an apparatus, for example including a mix of one or more of an RTL representation, a netlist representation, or another computer-readable definition to be used in a semiconductor design and fabrication process to fabricate an apparatus embodying the invention. Alternatively or additionally, the concept may be defined in a combination of a computer-readable definition to be used in a semiconductor design and fabrication process to fabricate an apparatus and computer-readable code defining instructions which are to be executed by the defined apparatus once fabricated.

Such computer-readable code can be disposed in any known transitory computer-readable medium (such as wired or wireless transmission of code over a network) or non-transitory computer-readable medium such as semiconductor, magnetic disk, or optical disc. An integrated circuit fabricated using the computer-readable code may comprise components such as one or more of a central processing unit, graphics processing unit, neural processing unit, digital signal processor or other components that individually or collectively embody the concept.

Some examples are set out in the following clauses:

(1) An apparatus, comprising:

fetch circuitry configured to fetch instructions for processing by processing circuitry, and prediction circuitry configured to identify instructions to be fetched by the fetch circuitry; wherein the prediction circuitry is configured to perform a lookup in a prediction table based on at least part of an address of a first instruction, and in response to the lookup identifying that the prediction table includes a skip-fetch-instruction entry corresponding to the address of the first instruction, the skip-fetch-instruction entry specifying information identifying an operation represented by at least one execute-without-fetch instruction subsequent in program order to the first instruction, the prediction circuitry is configured to:

control the fetch circuitry to skip fetching of the at least one execute-without-fetch instruction, and control the processing circuitry to perform the operation represented by the at least one execute-without-fetch instruction despite fetching of the at least one execute-without-fetch instruction being skipped.

(2) The apparatus according to clause 1, wherein the prediction circuitry is configured to determine whether a given entry of the prediction table is a skip-fetch-instruction entry based on an encoding of the given entry.

(3) The apparatus according to any preceding clause, wherein the prediction circuitry is configured to identify the operation represented by the at least one execute-without-fetch instruction based on an operation field of the skip-fetch-instruction entry.

(4) The apparatus according to clause 3, comprising skip-fetch-instruction operation storage circuitry, wherein the prediction circuitry is configured to identify the operation represented by the at least one execute-without-fetch instruction based on an entry in the skip-fetch-instruction operation storage circuitry selected based on the operation field the skip-fetch-instruction entry.

(5) The apparatus according to any preceding clause, wherein the prediction circuitry is configured to support an aliasing-prevention operation to prevent the lookup in the prediction table based on the address of the first instruction from triggering suppression of fetching of a subsequent instruction based on information specified by a skip-fetch-instruction entry allocated in response to a second instruction different from the first instruction.

(6) The apparatus according to clause 5, wherein the aliasing-prevention operation comprises performing the lookup in the prediction table using sufficient bits of the first address to enable a given instruction within a given instruction context to be distinguished from other instructions within the same instruction context.

(7) The apparatus according to clause 6, wherein the prediction circuitry is configured to perform the lookup by comparing the address of the first instruction against a match address specified by the skip-fetch-instruction entry, the skip-fetch-instruction entry is configured to specify a region entry of a region table, and the prediction circuitry is configured to determine a most-significant portion of the match address based on the specified region entry.

(8) The apparatus according to clause 7, wherein entries in the prediction table comprise a given field, and:

for an entry of the prediction table other than a skip-fetch-instruction entry the prediction circuitry is configured to determine, based on the given field, a region entry of a region table for determining a target address associated with that entry; and for a skip-fetch-instruction entry the prediction circuitry is configured to identify the operation represented by the at least one execute-without-fetch instruction based on the given field.

(9) The apparatus according to any of clauses 5 to 8, wherein the aliasing-prevention operation comprises, when triggered, preventing previously allocated entries of the prediction table from being treated by the prediction circuitry as skip-fetch-instruction entries.

(10) The apparatus according to any of clauses 5 to 9, wherein the aliasing-prevention operation comprises, when triggered, invalidating previously allocated entries of the prediction table.

(11) The apparatus according to any of clauses 9 or 10, wherein the prediction circuitry is configured to trigger the aliasing-prevention operation in response to determining that a next instruction to be fetched is in a different region of memory from an immediately preceding instruction.

(12) The apparatus according to any of clauses 9 to 11, wherein the prediction circuitry is configured to trigger the aliasing-prevention operation in response to identifying a change in context of the processing circuitry.

(13) The apparatus according to any preceding clause, wherein in response to the lookup identifying the skip-fetch-instruction entry corresponding to the address of the first instruction, the prediction circuitry is configured to determine a target address based on the skip-fetch-instruction entry and the fetch circuitry is configured to fetch instructions subsequent to the first address starting from the target address.

(14) The apparatus according to any preceding clause, wherein the prediction circuitry is configured to control the first instruction to progress to the processing circuitry with the first instruction associated with identifying information identifying that fetching of the at least one execute-without-fetch instruction was skipped.

(15) The apparatus according to clause 14,
wherein the prediction circuitry is configured to control the first instruction to progress to the processing circuitry identifying control information associated with the at least one execute-without-fetch instruction; and
the apparatus comprises resolution circuitry configured to determine, based on the control information, whether the operation represented by the at least one execute-without-fetch instruction was performed architecturally correctly.

(16) The apparatus according to clause 15, wherein the operation represented by the at least one execute-without-fetch instruction comprises a conditional operation, and the resolution circuitry is configured to determine whether the processing circuitry was controlled to perform an operation corresponding to an outcome of the condition.

(17) The apparatus according to any preceding clause, wherein in response to the lookup identifying that the prediction table includes a branch prediction entry corresponding to the address of the first instruction, the branch prediction entry identifying a branch target address, the prediction circuitry is configured to control the fetch circuitry to fetch a next instruction following the first instruction from the branch target address.

(18) A system comprising:
the apparatus of any preceding clause, implemented in at least one packaged chip;
at least one system component; and
a board,
wherein the at least one packaged chip and the at least one system component are assembled on the board.

(19) A chip-containing product comprising the system of clause 18, wherein the system is assembled on a further board with at least one other product component.

(20) A method for controlling processing circuitry and fetch circuitry for fetching instructions to be processed by the processing circuitry, comprising:
performing a lookup in a prediction table based on at least part of an address of a first instruction, and in response to the lookup identifying that the prediction table includes a skip-fetch-instruction entry corresponding to the address of the first instruction, the skip-fetch-instruction entry specifying information identifying an operation represented by at least one execute-without-fetch instruction subsequent in program order to the first instruction:
controlling the fetch circuitry to skip fetching of the at least one execute-without-fetch instruction, and
controlling the processing circuitry to perform the operation represented by the at least one execute-without-fetch instruction despite fetching of the at least one execute-without-fetch instruction being skipped.

(21) A non-transitory computer-readable medium storing computer-readable code for fabrication of an apparatus comprising:
fetch circuitry configured to fetch instructions for processing by processing circuitry, and
prediction circuitry configured to identify instructions to be fetched by the fetch circuitry; wherein
the prediction circuitry is configured to perform a lookup in a prediction table based on at least part of an address of a first instruction, and
in response to the lookup identifying that the prediction table includes a skip-fetch-instruction entry corresponding to the address of the first instruction, the skip-fetch-instruction entry specifying information identifying an operation represented by at least one execute-without-fetch instruction subsequent in program order to the first instruction, the prediction circuitry is configured to:
control the fetch circuitry to skip fetching of the at least one execute-without-fetch instruction, and
control the processing circuitry to perform the operation represented by the at least one execute-without-fetch instruction despite fetching of the at least one execute-without-fetch instruction being skipped.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

In the present application, lists of features preceded with the phrase "at least one of" mean that any one or more of those features can be provided either individually or in combination. For example, "at least one of: A, B and C" encompasses any of the following options: A alone (without B or C), B alone (without A or C), C alone (without A or B), A and B in combination (without C), A and C in combination (without B), B and C in combination (without A), or A, B and C in combination.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope of the invention as defined by the appended claims.

The invention claimed is:

1. An apparatus, comprising:

fetch hardware circuitry configured to fetch instructions for processing by processing hardware circuitry, and prediction hardware circuitry configured to identify instructions to be fetched by the fetch hardware circuitry; wherein the prediction hardware circuitry is configured to perform a lookup in a prediction table based on at least part of an address of a first instruction, and in response to the lookup identifying that the prediction table includes a skip-fetch-instruction entry corresponding to the address of the first instruction, the skip-fetch-instruction entry specifying information identifying an operation represented by at least one execute-without-fetch instruction subsequent in program order to the first instruction and the skip-fetch-instruction entry providing a target address field indicating a target address, the prediction hardware circuitry is configured to:

control the fetch hardware circuitry to skip fetching of the at least one execute-without-fetch instruction, and control the processing hardware circuitry to perform the operation represented by the at least one execute-without-fetch instruction despite fetching of the at least one execute-without-fetch instruction being skipped, and determine the target address based on the skip-fetch-instruction entry; and the fetch hardware circuitry is configured to resume fetching of instructions subsequent to the first instruction, following skipping of fetching of the at least one execute-without-fetch instruction, starting from the target address.

2. The apparatus according to claim 1, wherein the prediction hardware circuitry is configured to determine whether a given entry of the prediction table is a skip-fetch-instruction entry based on an encoding of the given entry.

3. The apparatus according to claim 1, wherein the prediction hardware circuitry is configured to identify the operation represented by the at least one execute-without-fetch instruction based on an operation field of the skip-fetch-instruction entry.

4. The apparatus according to claim 3, comprising skip-fetch-instruction operation storage hardware circuitry, wherein the prediction hardware circuitry is configured to identify the operation represented by the at least one execute-without-fetch instruction based on an entry in the skip-fetch-instruction operation storage hardware circuitry selected based on the operation field of the skip-fetch-instruction entry.

5. The apparatus according to claim 1, wherein the prediction hardware circuitry is configured to perform an aliasing-prevention operation to prevent the lookup in the prediction table based on the at least part of the address of the first instruction from triggering suppression of fetching of a subsequent instruction based on information specified by a skip-fetch-instruction entry allocated in response to a second instruction different from the first instruction.

6. The apparatus according to claim 5, wherein the aliasing-prevention operation comprises performing the lookup in the prediction table using sufficient bits of the address of the first instruction to enable a given instruction within a given instruction context to be distinguished from other instructions within the given instruction context.

7. The apparatus according to claim 6, wherein the prediction hardware circuitry is configured to perform the lookup by comparing the at least part of the address of the first instruction against a match address specified by the skip-fetch-instruction entry, the skip-fetch-instruction entry is configured to specify a region entry of a region table, and the prediction hardware circuitry is configured to determine a most-significant portion of the match address based on the specified region entry.

8. The apparatus according to claim 7, wherein entries in the prediction table comprise a given field, and:

for an entry of the prediction table other than a skip-fetch-instruction entry the prediction hardware circuitry is configured to determine, based on the given field, a region entry of a region table for determining a target address associated with that entry; and for a skip-fetch-instruction entry the prediction hardware circuitry is configured to identify the operation represented by the at least one execute-without-fetch instruction based on the given field.

9. The apparatus according to claim 5, wherein the aliasing-prevention operation comprises, when triggered, preventing previously allocated entries of the prediction table from being treated by the prediction hardware circuitry as skip-fetch-instruction entries.

10. The apparatus according to claim 9, wherein the prediction hardware circuitry is configured to trigger the aliasing-prevention operation in response to determining that a next instruction to be fetched is in a different region of memory from an immediately preceding instruction.

11. The apparatus according to claim 9, wherein the prediction hardware circuitry is configured to trigger the aliasing-prevention operation in response to identifying a change in context of the processing hardware circuitry.

12. The apparatus according to claim 5, wherein the aliasing-prevention operation comprises, when triggered, invalidating previously allocated entries of the prediction table.

13. The apparatus according to claim 1, wherein the prediction hardware circuitry is configured to control the first instruction to progress to the processing hardware circuitry with the first instruction associated with identifying information identifying that fetching of the at least one execute-without-fetch instruction was skipped.

14. The apparatus according to claim 13, wherein the prediction hardware circuitry is configured to control the first instruction to progress to the processing hardware circuitry identifying control information associated with the at least one execute-without-fetch instruction; and the apparatus comprises resolution hardware circuitry configured to determine, based on the control information, whether the operation represented by the at least one execute-without-fetch instruction was performed architecturally correctly.

15. The apparatus according to claim 1, wherein in response to the lookup identifying that the prediction table includes a branch prediction entry corresponding to the address of the first instruction, the branch prediction entry identifying a branch target address, the prediction hardware circuitry is configured to control the fetch hardware circuitry to fetch a next instruction following the first instruction from the branch target address.

16. A system comprising:

the apparatus of claim 1, implemented in at least one packaged chip;

at least one system component; and a board, wherein the at least one packaged chip and the at least one system component are assembled on the board.

17. A chip-containing product comprising the system of claim 16, wherein the system is assembled on a further board with at least one other product component.

18. A method for controlling processing hardware circuitry and fetch hardware circuitry for fetching instructions to be processed by the processing hardware circuitry, comprising:

performing a lookup in a prediction table based on at least part of an address of a first instruction, and in response to performing the lookup, identifying that the prediction table includes a skip-fetch-instruction entry corresponding to the address of the first instruction, the skip-fetch-instruction entry specifying information identifying an operation represented by at least one execute-without-fetch instruction subsequent in program order to the first instruction and the skip-fetch-instruction entry providing a target address field indicating a target address, and in response to the identifying:

controlling the fetch hardware circuitry to skip fetching of the at least one execute-without-fetch instruction, controlling the processing hardware circuitry to perform the operation represented by the at least one execute-without-fetch instruction despite fetching of the at least one execute-without-fetch instruction being skipped, and determining the target address based on the skip-fetch-instruction entry; and resuming fetching of instructions subsequent to the first instruction, following skipping of fetching of the at least one execute-without-fetch instruction, starting from the target address.

19. A non-transitory computer-readable medium storing computer-readable code for fabrication of an apparatus comprising:

fetch hardware circuitry configured to fetch instructions for processing by processing hardware circuitry, and prediction hardware circuitry configured to identify instructions to be fetched by the fetch hardware circuitry; wherein the prediction hardware circuitry is configured to perform a lookup in a prediction table based on at least part of an address of a first instruction, and in response to the lookup identifying that the prediction table includes a skip-fetch-instruction entry corresponding to the address of the first instruction, the skip-fetch-instruction entry specifying information identifying an operation represented by at least one execute-without-fetch instruction subsequent in program order to the first instruction and the skip-fetch-instruction entry providing a target address field indicating a target address, the prediction hardware circuitry is configured to:

control the fetch hardware circuitry to skip fetching of the at least one execute-without-fetch instruction, control the processing hardware circuitry to perform the operation represented by the at least one execute-without-fetch instruction despite fetching of the at least one execute-without-fetch instruction being skipped, and determine the target address based on the skip-fetch-instruction entry; and the fetch hardware circuitry is configured to resume fetching of instructions subsequent to the first instruction, following skipping of fetching of the at least one execute-without-fetch instruction, starting from the target address.

* * * * *